United States Patent Office 3,449,781
Patented June 17, 1969

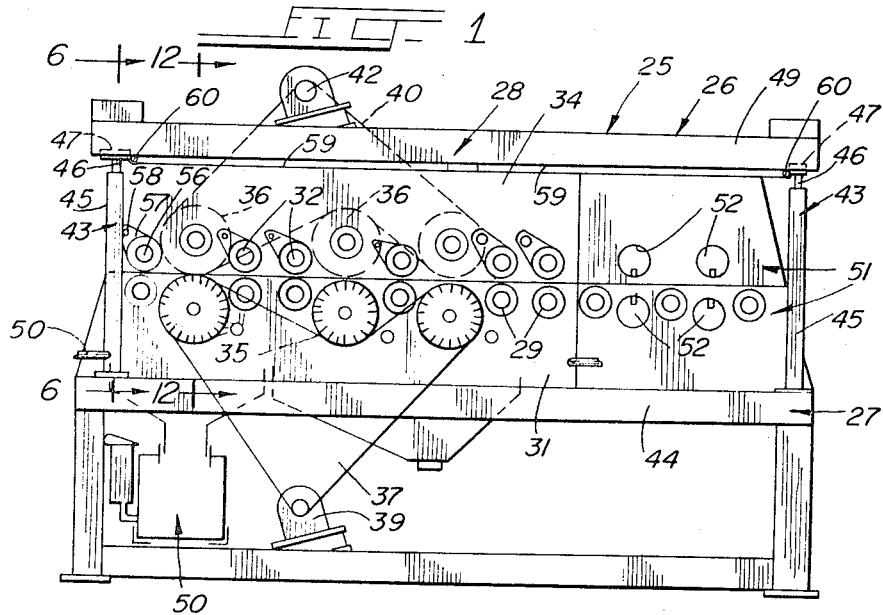

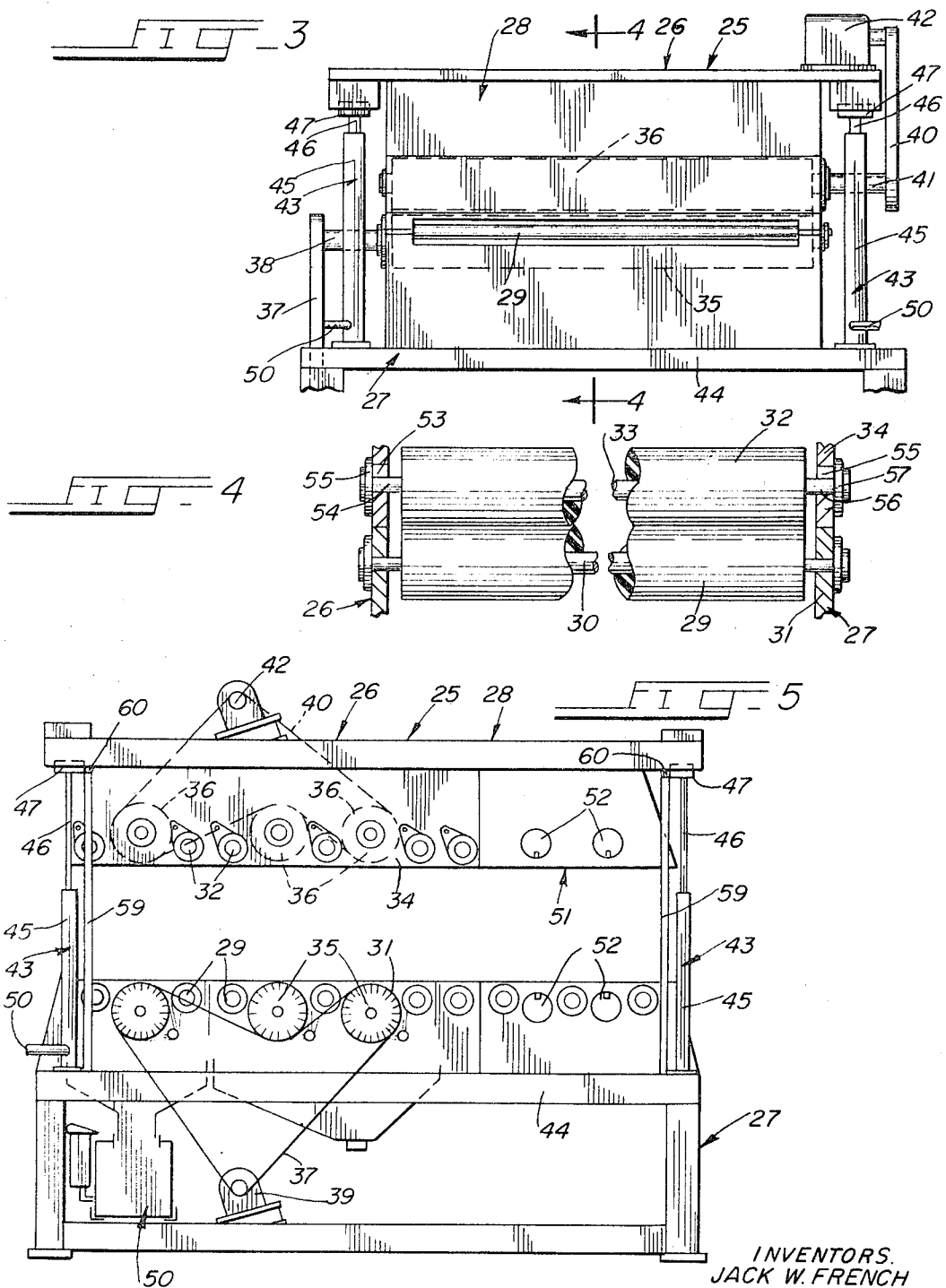

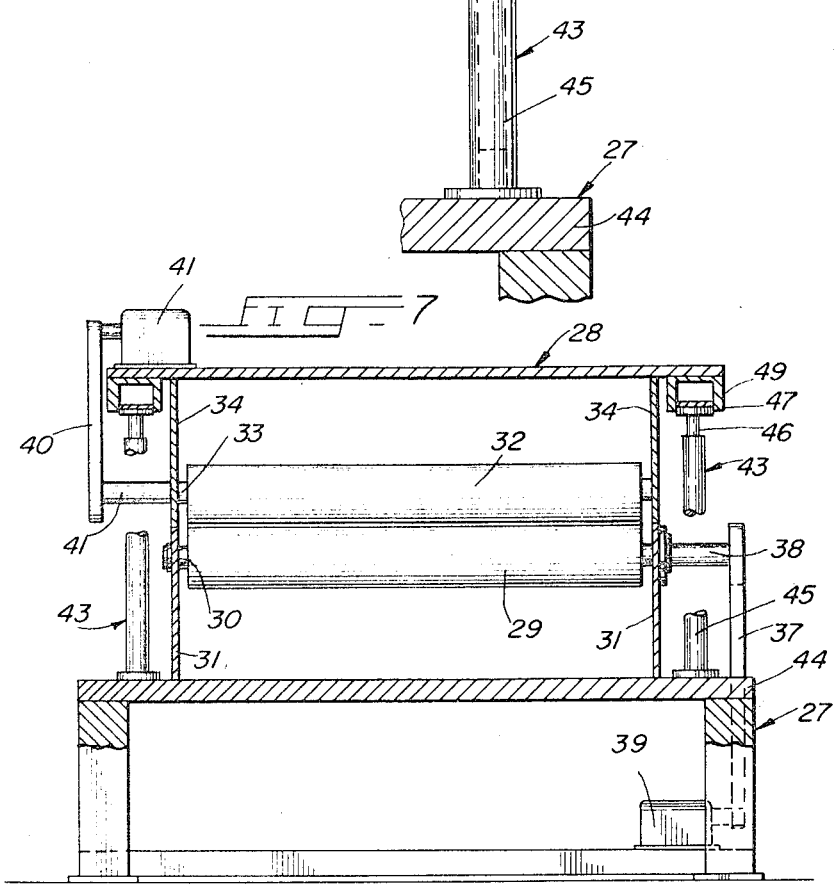

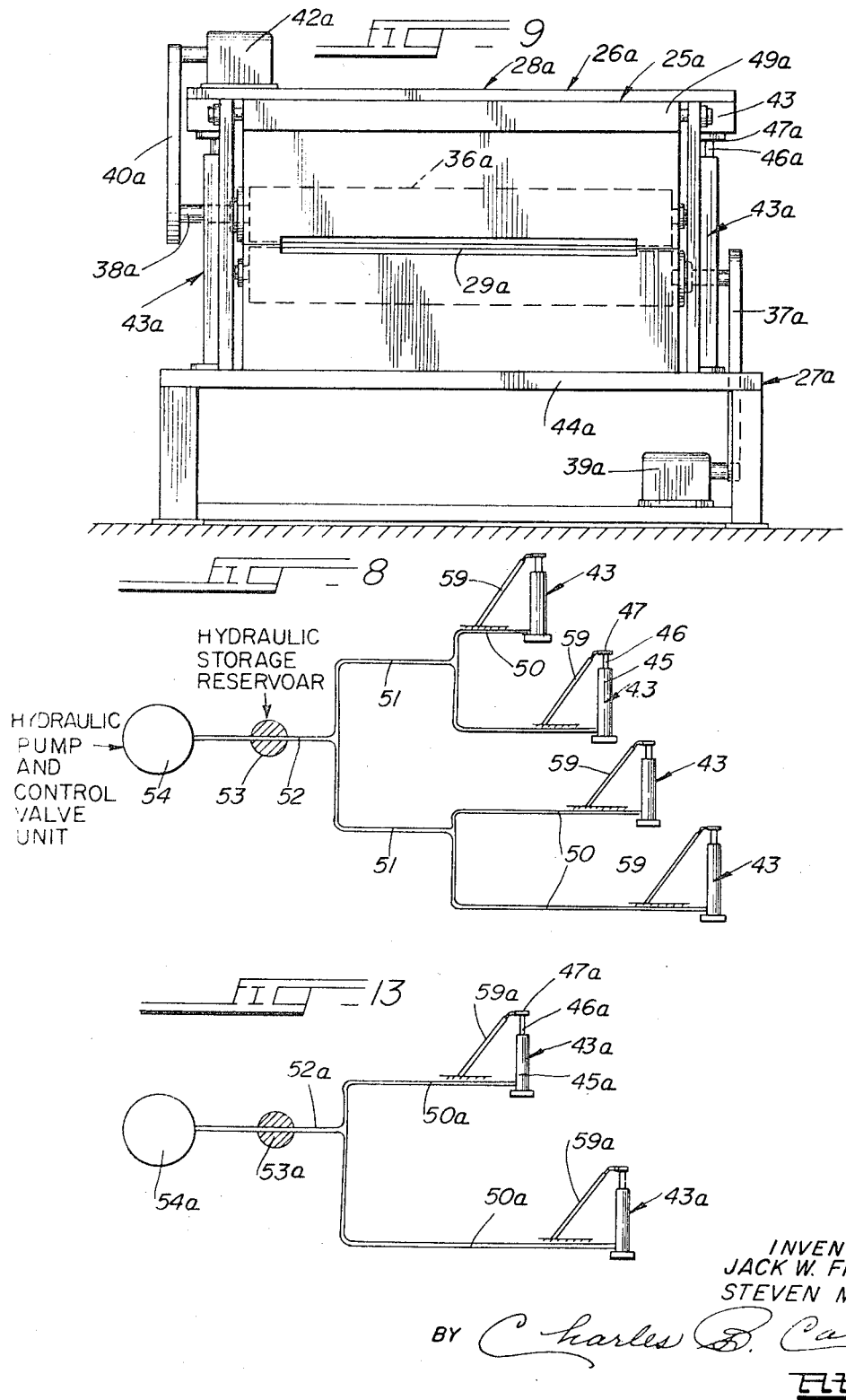

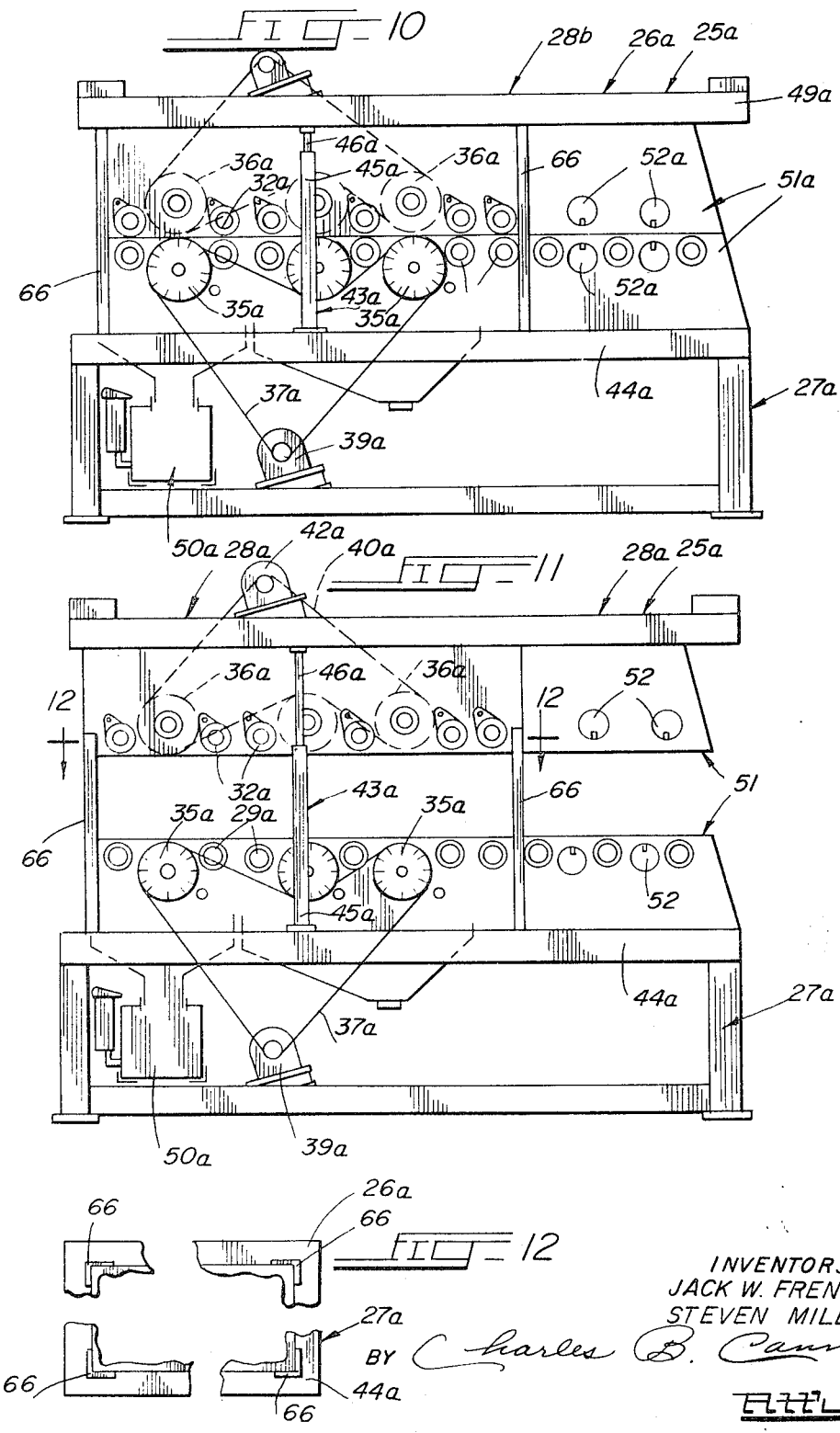

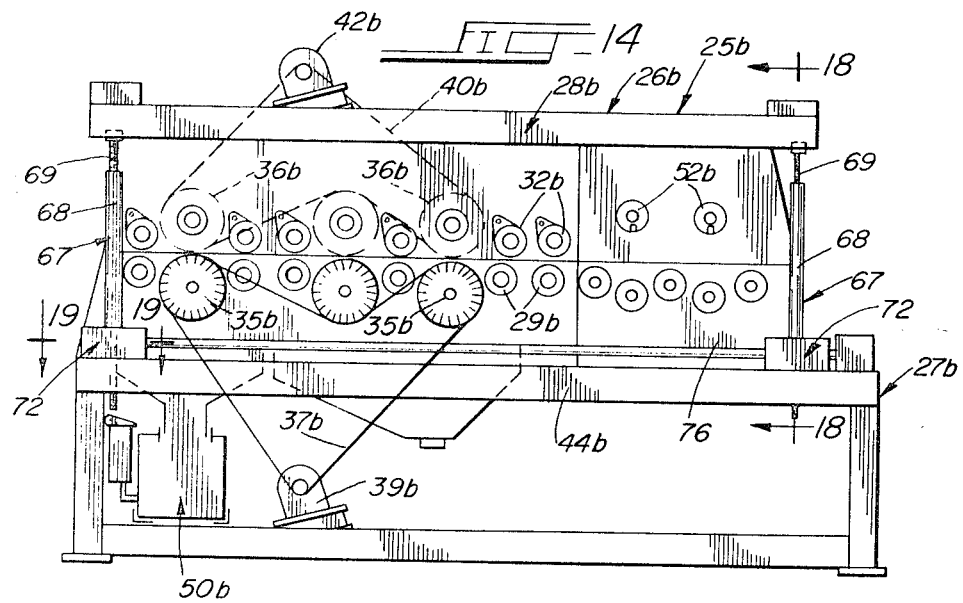
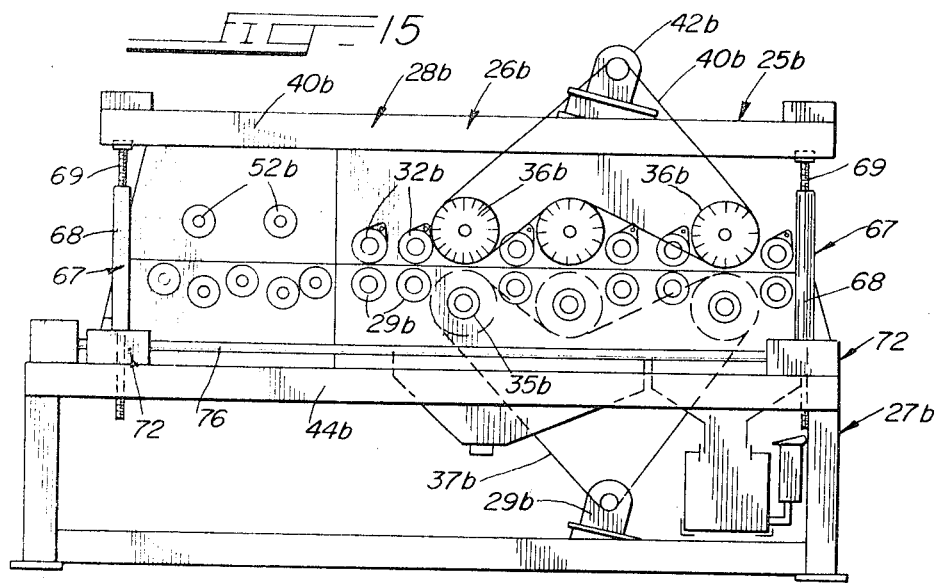

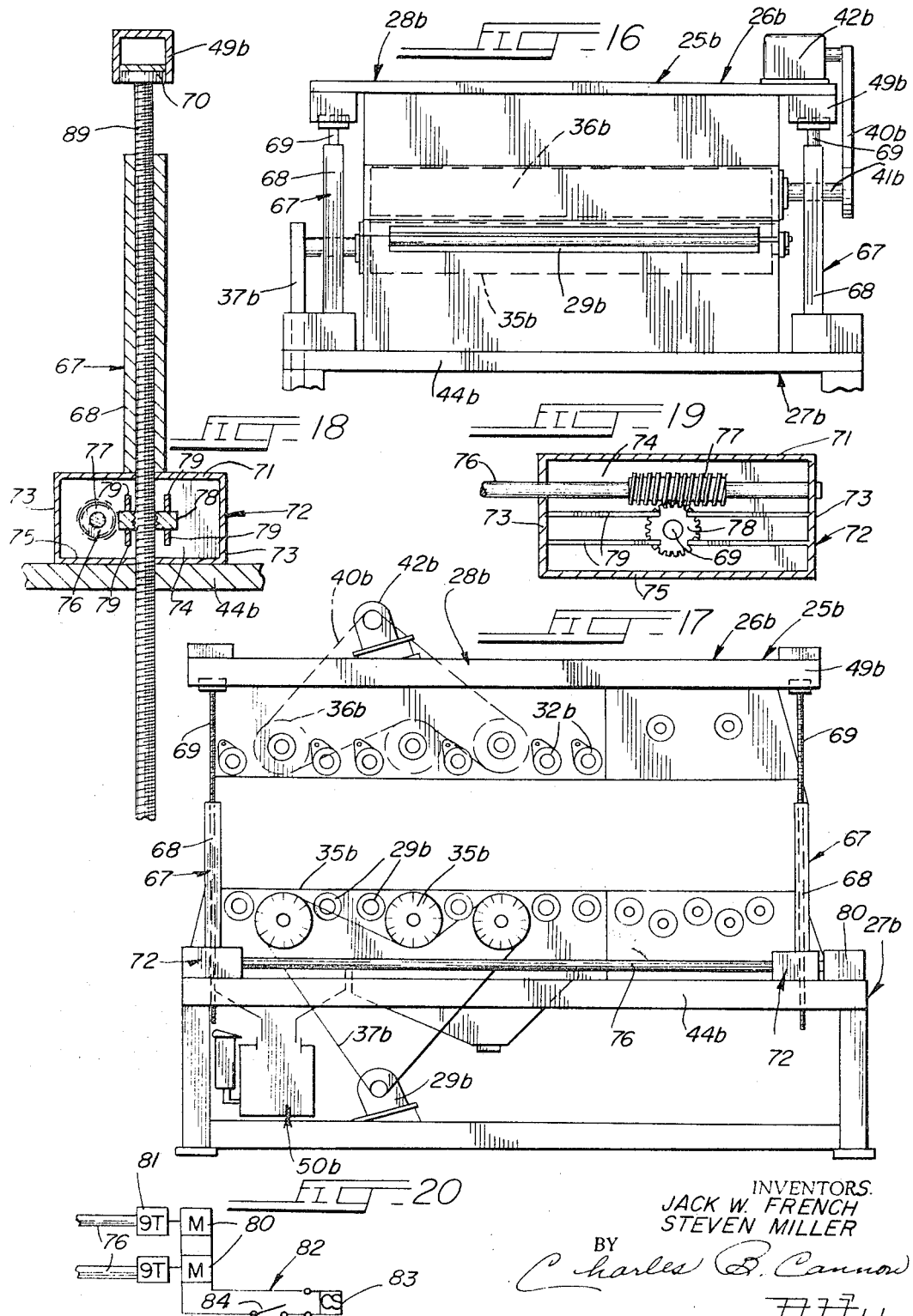

3,449,781
GLASS WASHING APPARATUS
Jack W. French, Lake Forest, and Steven Miller, Berwyn, Ill., assignors to Sommer & Maca Glass Machinery Company, Chicago, Ill., a corporation of Illinois
Filed Dec. 22, 1966, Ser. No. 604,031
Int. Cl. B08b 1/02
U.S. Cl. 15—77                     3 Claims

ABSTRACT OF THE DISCLOSURE

Flat glass washing apparatus including a supporting frame which embodies a relatively stationary lower frame unit and a relatively movable upper frame unit. A lower bank of glass sheet-advancing rolls, a lower bank of rotary brushes, and a lower bank of blower tubes are mounted on the relatively stationary lower frame unit, and an upper bank of glass sheet-advancing rolls, an upper bank of rotary brushes, and an upper bank of blower tubes are mounted on the relatively movable upper frame unit. Power means is provided for raising and lowering the relatively movable upper frame unit, the upper bank of glass sheet-advancing rolls, the upper bank of rotary brushes, and the upper bank of blower tubes carried thereby relative to the relatively stationary frame unit and the lower bank of glass-sheet advancing rolls, rotary brushes, and blower tubes while maintaining the relatively movable upper frame unit and the parts carried thereby in a generally horizontal position and generally parallel to the lower and relatively stationary frame unit. Means are provided for bracing the upper and relatively movable frame unit and the parts carried thereby against lateral movement when the relatively movable frame unit and the parts carried thereby are in raised position, in the event of failure of the power means which raises and lowers the relatively movable upper frame unit and the parts carried thereby.
Means are also provided for retaining the relatively movable upper frame unit and the parts carried thereby in a raised position to enable access to be had to the area between the relatively movable upper frame unit and the relatively stationary lower frame unit and the parts carried thereby for the removal of broken segments or chips of glass (cullet), or for the repair, replacement or servicing of parts of the apparatus.

---

This invention relates to glass washing apparatus which is particularly adapted for use in washing glass sheets.

One of the problems experienced in the use of glass washing apparatus for washing glass sheets is the fact that occassionally such glass sheets will become broken or fractured as they pass through the washing apparatus, thereby necessitating the removal of the broken segments or sections of the glass before further washing operations can be repeated. This, in turn, makes it desirable that the upper and lower banks or rubber advancing rolls and the upper and lower banks of rotary brushes be separated to permit a workman to gain access to the area between the upper and lower banks of rubber advancing rolls and the upper and lower banks of rotary brushes to remove the broken segments and chips of glass, known as cullet, and this is a time-consuming and laborious operation in that it can require dismantling a substantial part of the glass washing apparatus, or if this is not done, further breakage of glass may result.

Likewise, it is necessary occasionally in the use of flat glass washing apparatus to separate the upper and lower banks of rubber advancing rolls and the upper and lower banks of rotary brushes to permit a workman to have access to the various parts of the apparatus for the purpose of maintenance and repair, or for other reasons.

It is also desirable that the upper bank of advancing rolls and the upper bank of rotary brushes carried thereby be capable of being readily and easily adjusted upwardly relatively small distances so as to separate them correspondingly from the lower bank of rotary advancing rolls and rotary brushes so as to avoid undue pressure of the rotary brushes on the flat glass sheets fed through the glass washing apparatus when flat glass sheets of greater thickness than that for which the rotary advancing rolls and rotary brushes have been adjusted are fed through the flat glass washing apparatus.

Accordingly, an object of the present invention is to provide a new and improved glass washing apparatus which is so designed and constructed that it enables the upper and lower banks of advancing rolls and rotary brushes to be readily separated to permit ready access to the area between the upper and lower banks of rubber advancing rolls and rotary brushes to permit the removal of fragments of broken glass, or for the purpose of maintenance and repair, or for other purposes, and without the necessity for dismantling a substantial part of the glass washing aparatus as in the use of prior flat glass washing apparatus.

Another object of the invention is to provide a new and improved glass washing aparatus which embodies power-actuated lift means which may be readily operated to effect separation of the uper and lower banks of rubber advancing rolls and rotary brushes to permit access to the area between the upper and lower banks of rubber advancing rolls and rotary brushes for removal of broken segments or pieces of glass or for the purpose of maintenance and repair, or for other purposes.

An additional object of the invention is to provide in the new glass washing apparatus means for readily and quickly raising the upper and movable frame unit and the upper bank of advancing rolls and the upper bank of rotary brushes carried thereby relatively small distances, such, for example, as ⅛", to accommodate the rotary advancing rolls and rotary brushes to variations in the thickness of the glass sheets fed through the new glass washing apparatus and without undue wear on the rotary brushes when glass sheets of greater thickness than that for which the advancing rolls and rotary brushes were originally adjusted are fed through the flat glass washing apparatus..

Other objects will appear hereinafter.

In the drawings:

FIG. 1 is a side elevational view of one embodiment of the new flat glass washing apparatus embodying the present invention;

FIG. 2 is a side elevational view of the new glass washing apparatus shown in FIG. 1 as seen from the side opposite that shown in FIG. 1;

FIG. 3 is an end elevational view as seen from the left-hand end in FIG. 1;

FIG. 4 is a fragmentary transverse vertical sectional view on line 4—4 in FIG. 3;

FIG. 5 is a side elevational view, similar to FIG. 1, but showing the upper movable frame unit and the upper bank or rubber advancing rolls and the upper bank of rotary brushes carried thereby in raised position and separated from the lower bank of advancing rolls and from the lower bank of rotary brushes;

FIG. 6 is an enlarged vertical sectional view illustrating one form of the lifting jack units which may be embodied in the invention;

FIG. 7 is an enlarged transverse sectional view of the form of the new flat glass washing apparatus shown in FIGS. 1 to 6, inclusive, FIG. 8 is a schematic view illustrating one form of hydraulic jacks and hydraulic power transmission means therefor which may be used for raising the upper movable frame unit and the upper bank of advancing rolls and the upper bank of rotary brushes carried thereby and separating them from the lower and relatively stationary frame unit and the lower bank of advancing rolls and the lower bank of rotary brushes in the form of the invention shown in FIGS. 1 to 7, inclusive.

FIG. 9 is an end elevational view of a modified form of the invention;

FIG. 10 is a side elevational view of the form of the invention shown in FIG. 9;

FIG. 11 is a side elevational view of the form of the invention shown in FIGS. 9 and 10 but showing the upper movable frame unit and the upper bank of rubber advancing rolls and the upper bank of rotary brushes carried by the upper movable frame unit in raised position;

FIG. 12 is a fragmentary top plan view on line 12—12 in FIG. 11;

FIG. 13 is a diagrammatic view of a typical form of hydraulic power transmission means which may be used for raising the upper movable frame unit and the upper bank of advancing rolls and the upper bank of rotary brushes carried by the upper movable frame unit in the form of the invention illustrated in FIGS. 9, 10, 11 and 12;

FIG. 14 is a side elevational view similar to FIG. 1, but illustrating a preferred form of the invention;

FIG. 15 is a side elevational view of the preferred form of the invention illustrated in FIG. 14 as seen from the side opposite that shown in FIG. 14;

FIG. 16 is an end elevational view of the preferred form of the invention illustrated in FIGS. 14 and 15 as seen from the left end in FIG. 14;

FIG. 17 is a side elevational view, similar to FIG. 14, but showing the upper movable frame unit and the upper bank of rubber advancing rolls and the upper bank of rotary brushes carried by the upper movable frame unit in raised position and separated from the lower and relatively stationary frame unit and fom the lower bank of advancing rolls and from the lower bank of rotary brushes carried by the lower and relatively stationary frame unit;

FIG. 18 is a longitudinal vertical sectional view on line 18—18 in FIG. 14 illustrating one of the screw jack lift units embodied in the preferred form of the invention illustrated in FIGS. 14 to 17, inclusive;

FIG. 19 is a sectional top plan view on line 19—19 in FIG. 14 and illustrating a typical form of power transmission means for operating the screw jack lift units embodied in the form of the invention illustrated in FIGS. 14 to 18, inclusive; and FIG. 20 is a schematic diagram of a typical motor control circuit which may be employed to operate the screw jack lift units and the power transmission means therefor in the preferred form of the invention illustrated in FIGS. 14 to 19, inclusive.

One embodiment of the present invention is illustrated in FIGS. 1 to 8, inclusive, of the drawings, wherein it is generally indicated at 25 and comprises a supporting frame 26 which includes a lower and relatively stationary frame unit 27 and an upper and relatively movable frame unit 28. A lower bank of rubber advancing rolls 29 are rotatably mounted on shafts 30 which are rotatably journalled in the side walls 31 of the lower and relatively stationary frame unit 27 and a similar upper bank of rubber advancing rolls 32 are rotatably mounted on shafts 33 which are rotatably journalled in the side walls 34 of the upper and realtively movable frame unit 28. Similarly, a lower bank of rotary brushes or so-called brush rolls 35 are rotatably mounted on the relatively stationary lower frame unit 27 and a similar upper bank of rotary brushes or brush rolls 35 are rotatably mounted on the upper and reltaively movable frame unit 28.

The lower bank of rotary brushes or brush rolls 35 may be driven by any suitable power means and power transmission means, and a typical form of such power means and power transmission means is generally illustrated in FIGS. 1 and 6 and comprises a belt and pulley power transmission system 37 which is operatively connected to the supporting shafts 38 for the lower bank of rotary brushes 35 which are rotatably journalled in the side walls 31 of the lower frame unit 27; the belt and pulley system 37 being driven by a motor unit 39 which is suitably mounted on the lower and relatively stationary supporting frame unit 27. Similarly, the upper bank of rotary brushes 36 may be driven by any suitable power means and power transmission such as a belt and pulley power transmission system 40 which is operatively connected to the supporting shafts 41 for the upper bank of rotary brushes 36 and which shafts 41 are rotatably journalled in the side walls 34 of the relatively movable frame unit 28; the belt and pulley system 40 being driven by a motor unit 42 which is mounted on the upper and relatively movable frame unit 28.

The new glass washing apparatus embodies power means and power transmission means for mechanically and relatively quickly lifting and separating the relatively movable upper supporting frame 28 and the upper bank of advancing rolls 32 and rotary brushes 36 carried thereby from the lower and relatively stationary frame unit 27 and the lower bank of rotary advancing rolls 29 and the lower rotary brushes 35 carried thereby. One form of such power lifting means comprises a bank of hydraulically operated jack lift units 43 (shown as being four (4) in number) which are mounted in suitably spaced relationship on horizontally extending and generally rectangular-shaped beam or frame member 44 of the lower and relatively stationary frame unit 27. Each of these hydraulic jack lift units 43 includes a hydraulic jack cylinder 45 which is mounted on and supported by the horizontally extending frame member 44 of the lower and relatively stationary frame unit 27. Each of the hydraulic jack units 43 also includes a piston 46 having a jack head 47 at its upper end which projects into a recess 48 which is formed in the lower surface of a horizontally extending and generally rectangular-shaped supporting frame member 49 of the upper and relatively movable supporting frame unit 28 (FIGS. 6 and 7).

As shown in FIG. 8, the hydraulic cylinder 45 of each of the hydraulic jack units 43 is operatively connected by an hydraulic fluid line 50–51–52 to an hydraulic fluid storage reservoir 53 which, in turn, is connected to an hydraulic pump and control valve unit 54.

A suitable detergent tank and pump unit 50, and a suitable air drier unit 51 including air drier or blower tubes 52 may be embodied in the new flat glass washing apparatus, as is well understood in the art.

As shown in FIG. 4, a slot 55 is provided in each of the side walls 34 of the upper and relatively movable supporting frame unit 28, and the end portions 56 of the shafts 33 which support the upper advancing rolls 32 are movably mounted in these slots 55. The end portions 56 of the shafts 33 are attached to and are carried by generally triangular-shaped pivot bracket members 57 which are pivotally mounted, as at 58, on the outer surfaces of the side walls 34 of the upper and relatively movable supporting frame unit 28.

As shown in FIGS. 5 and 6, a safety brace member 57 is hingedly connected, as at 58, to an arm 59 which is fixedily attached to the upper supporting frame member 49 and each of these brace members 57 has a latching pin 60 thereon which is adapted to be latchingly engaged by a latch member in the form of a latch hook 61 which is pivotally mounted, as at 62, on a portion 63 of the upper supporting frame unit 28 (FIG. 5).

In the use of the form of the invention illustrated in FIGS. 1 to 8, inclusive, flat glass sheets may be fed through the new flat glass washing apparatus 25 (left to right, FIG. 1) between the upper bank of rubber advancing rolls 32 and the upper bank of rotary brushes 36 and the lower bank of rotary advancing rolls 29 and the lower bank of rotary brushes 35 to perform the washing operation thereon. In the event that a sheet of flat glass is broken or fractured during the washing operation, or in the event that it becomes necessary or desirable to have access to the interior of the new flat glass washing apparatus 25, that is, to the area between the upper movable frame unit 28 and the lower and relatively stationary frame unit 27, for the purpose of removal of fragments of broken glass, or for the purpose of repair or replacement of parts, or for any other reason, the upper and relatively movable frame unit 28 and the upper bank of rotary advancing rolls 32 and the upper bank of rotary brushes 36 carried thereby may be readily separated from the lower and relatively stationary frame unit 27 and the lower bank of rotary advancing rolls 29 and from the lower bank of rotary brushes 35 carried thereby. This is accomplished by activating the hydraulic pump and control valve unit 54, as shown in FIG. 8, so as to supply hydraulic fluid from the reservoir 53 through the hydraulic line 52–51–50 to the cylinders 45 of each of the hydraulic jack units 43, thereby raising the pistons 46 of the hydraulic jack units 43 and attached jack heads 47 which act, through the horizontal frame member 49 of the upper and relatively movable frame unit 28 to lift the relatively movable upper frame unit 28 and the upper bank of advancing rolls 32 and the upper bank of rotary brushes 36 into raised position, above and relative to the lower and relatively stationary frame unit 27 and relative to the lower bank of rotary advancing rolls 29 and rotary brushes 35 in FIG. 5.

This action separates the upper bank of advancing rolls 32 and the upper bank of rotary brushes 36 from the lower bank of advancing rolls 29 and the lower bank of rotary brushes 35, while, at the same time, separating the upper air blowers 52 from the lower air blowers 52. In this manner access is provided to the area between the upper and relatively movable frame unit 28 and the upper bank of rotary advancing rolls 32 and the upper bank of rotary brushes 36 and the upper bank of air blower units 52 and the lower and relatively stationary frame unit 27 and the lower bank of rotary advancing rolls 29 and the lower bank of rotary brushes 35 and the lower bank of air blowers 52 to permit the removal of fragments of broken glass, or for the purpose of maintenance, and repair, or for other reasons, and without the necessity for substantially dismantling the flat glass washing apparatus, as in the use of prior art flat glass washing devices.

The brace members 59 are normally disposed in a horizontal position, as shown in FIGS. 1, 2 and 6. However, when the upper and movable frame unit 28 and the parts carried thereby are thus raised into a position above the lower and relatively stationary frame unit 27, and the parts carried thereby, the latch hooks 63 may be disengaged from the latch pins 62 and the brace members allowed to pivot, by gravity, on their pivoted mountings 60, into vertical position, as in FIG. 5, and when in this position the then lower end portions of the brace members 59 bear on the upper surface of the generally rectangular-shaped frame member 44 of the lower and relatively stationary frame unit 44. When so disposed the brace members 59 prevent any possibility of the upper and relatively movable frame unit 28 and the parts carried thereby from falling downwardly in the event of a failure in the hydraulic jack units 43 or the hydraulic operating system therefor shown in FIG. 8. In this manner a workman working in the area or space (FIG. 5) between the upper and relatively movable frame unit 28 and the parts carried thereby and the lower and relatively stationary frame unit 27 and the parts carried thereby is protected against any possible injury in the event of the failure of the hydraulic jack units 43 or of the hydraulic operating system therefor (FIG. 8).

After the broken fragments of glass have been removed, or after the necessary repair or replacement work on the new flat glass washing apparatus has been completed, the brace members 59 may be raised into horizontal position and latched in that position by engaging the latch hooks 63 with the latch pins 62 whereupon the relatively movable upper frame unit 28 and attached upper bank of rotary advancing rolls 32 and rotary brushes 36 and other parts carried thereby may be lowered into normal working position, as in FIGS. 1 and 2, by activating the hydraulic pump and control valve unit 54 in the hydraulic system (FIG. 8) so as to cause the hydraulic fluid in the hydraulic jack cylinders 45 to run out of the hydraulic jack cylinders 45 and through the hydraulic line 50–51–52 back into the hydraulic storage reservoir 53. This acts to permit the upper and relatively movable frame unit 28 and attached parts to be lowered into effective and normal working position as in FIGS. 1 and 2.

The end portions 56 of the supporting shafts 33 for the upper bank of rubber or like rotary advancing rolls 32 are pivotally mounted on the supporting brackets 57 which, in turn, are pivotally mounted, as at 58, on the side walls 34 of the upper movable frame unit 28 so that the upper bank of rotary advancing rolls 32 may be adjusted on the pivoted bracket member mountings 57 relative to the lower bank of rotary advancing rolls 29. However, this adjustable pivoted mounting of the supporting shafts 33–56 and the upper bank of rotary advancing rolls 32 carried thereby does not constitute a part of the present invention.

A modification of the invention is illustrated in FIGS. 9 to 13, inclusive, and in this form of the invention those parts thereof which are similar to or comparable to corresponding parts in the form of the invention illustrated in FIGS. 1 to 8, inclusive, have been given the same reference numerals followed by the additional and distinguishing reference character $a$.

The form of the invention illustrated in FIGS. 9 to 13, inclusive, differs in one respect, from that shown in FIGS. 1 to 8, inclusive, in that in the form of the invention illustrated in FIGS. 9 to 13, inclusive, only a single pair of hydraulic jack units 43a are employed for raising and lowering the relatively movable upper frame unit 28a and the hydraulic system therefor is modified accordingly (FIG. 13).

The form of the invention illustrated in FIGS. 9 to 13, inclusive, also differs from the form of the invention illustrated in FIGS. 1 to 8, inclusive, in that in the form of the invention illustrated in FIGS. 9 to 13, inclusive, four vertically extending guide units in the form of angle iron guide members 66 are rigidly mounted at suitably spaced intervals (in a generally rectangular pattern, FIG. 2) on the horizontal and generally rectangular-shaped frame member 44a of the lower and relatively stationary frame unit 27a at the corners thereof as shown in FIG. 12.

In the form of the invention illustrated in FIGS. 9 to 13, inclusive, the relatively stationary lower frame unit 27a and the relatively movable upper frame unit 28a are normally disposed in operative position relative to each other as shown in FIGS. 9 and 10. However, if and when it becomes necessary or desirable to raise the movable upper frame unit 28a and the parts carried thereby above the lower and relatively stationary frame unit 27a for the purpose of removing broken fragments of glass from between the upper and lower banks of advancing rolls 32 and 28a, respectively, and from between the upper and lower banks of rotary brushes 36a and 35a, respectively, of from between the upper and lower banks of air blower units 52a, or for other reasons, this may be accomplished by actuating the hydraulic pump and control valve unit 54a (FIG. 13) so as to direct hydraulic fluid from the hydraulic fluid reservoir 53a through the hydraulic fluid line 52a–50a into the cylinders 45a of the hydraulic jack units 43a so as to raise the pistons 46a and the hydraulic jack heads 47a attached thereto. This action raises the upper and relatively movable frame units 28a, and the parts carried thereby into raised position, as shown in FIG. 11, thereby separating the upper movable frame unit 28a and the parts carried thereby from the lower and relatively stationary frame unit 27a and the parts carried thereby, so as to permit access to the area therebetween for the removal of broken glass fragments, or for the purpose of maintenance and repair, or for other reasons.

After the broken glass fragments have been removed, or the necessary maintenance or repair work has been done, the relatively movable upper frame unit 28a and the parts carried thereby may be lowered into normal working position, as in FIGS. 9 and 10, by activating the hydraulic pump and control valve unit 54a so as to allow hydraulic fluid to flow out of the hydraulic jack cylinders 45a through the hydraulic fluid line 50a–51a back to the hydraulic fluid reservoir 53a, thereby allowing the pistons 46a and the jack heads 47a carried thereby to drop in the hydraulic cylinders 45a and thus lower the upper and relatively movable upper frame unit 28 and the parts carried thereby into lowered position, as in FIGS. 9 and 10.

During movement of the upper and lower relatively movable frame unit 28a and the parts carried thereby, in the form of the invention illustrated in FIGS. 9 to 13, inclusive, the upper movable frame unit 28a and the parts carried thereby are guided by the vertically extending guide members 66 and the use of these guide members 66 makes it possible to use only two of the hydraulic jack units 43a in the form of the invention illustrated in FIGS. 9 to 13, inclusive, as distinguished from the four hydraulic jack units 43 which are employed in the form of the invention illustrated in FIGS. 1 to 8, inclusive.

Another and preferred form of the invention is illustrated in FIGS. 14 to 20, inclusive, of the drawings, and those parts thereof which are similar or comparable to corresponding parts in the form of the invention illustrated in FIGS. 1 to 8, inclusive, have been given the same reference numerals followed by the additional and distinguishing reference character b.

The form of the invention illustrated in FIGS. 14 to 20, inclusive, differs from that shown in FIGS. 1 to 8, inclusive, primarily in that in the form of the invention illustrated n FIGS. 14 to 20, inclusive, a bank of jack screw lift units 67 (shown as being four in number) are suitably spaced in a generally rectangular pattern, and are substituted for the hydraulic jack units 43 in the form of the invention illustrated in FIGS. 1 to 8, inclusive.

Each of the jack screw units 67 includes a cylindrical housing 68 in which an elongated screw member 69 is mounted for vertical movement, and each of the screw members 69 has a jack head or cap 70 thereon at its upper end and which bears against the horizontally extending frame member 49b of the upper frame units 27b (FIGS. 14, 15, 16 and 17).

Each of the jack screw cylinders 68 rests on the top wall 71 of the housing 72 which, in turn, is mounted on the horizontal frame member 44b of the lower and relatively stationary frame units 27b. Each of the housings 72 also includes side walls 73, end walls 74, and a bottom wall 75 (FIGS. 18–19).

An elongated worm gear shaft 76 extends horizontally between and through the side walls 73 of each pair of the housings 72 and is rotatably journalled in the side walls 73 thereof; there being two of these worm gear shafts 76. A pair of worm gears 77 are provided on each of the worm gear shafts 76 and each of these worm gears 77 meshes with a spur gear 78 which is mounted on each of the jack screw members 69 within one of the housings 72. A pair of stabilizing and guide bars 79 extend between the side walls 73 of each of the housings 72, between the top and bottom walls 71 and 75, and the end portions of these stabilizing and guide bars 79 are mounted in the end walls 73 and the housings 72. Thus, as shown in FIGS. 18 and 19 there are two of the stabilizing and guide bars 79 on each side of each of the jack screw members 69 and two of the stabilizing and guide members 79 are arranged above and two of them below each of the spur gears 78. These stabilizing and guide members 79 cooperate to prevent undesired up and down or vibratory movement of the spur gears 78 during operation thereof (FIGS. 18–19).

Each of the worm gear shafts 76 may be driven by any suitable electric power and power transmission means mounted on the generally rectangular frame member 44b of the lower and relatively stationary frame unit 77b as shown schematically in FIG. 20, this arrangement may include a suitably reversible operating motor 80 which is operatively connected to a gear train 81 which, in turn, is operatively connected to the adjacent worm gear 76. The operating motor 80 is arranged in an electric circuit 82 which is connected to an electric current supply source 83 and the operating circuit 82 may be controlled by a suitable manually operable micro-switch unit 84, or the like.

The use and operation of the preferred form of the invention illustrated in FIGS. 14–20 are as follows: When it is desired to raise the upper movable frame unit 28b and the parts carried thereby relative to the lower and relatively stationary frame unit 27b and the parts carried thereby, the control switches 84 may be closed to energize the electric circuit 82 and thus activate the operating motors 80 which, in turn, act through the gear trains 81 to rotate the horizontally extending worm gear shafts 76 and the worm gears 77 carried thereby. Such rotation of the worm gears 77 acts, through the spur gears 78, to rotate the vertically extending jack screws 69 in their cylinders 68 and this rotation of the jack screws 69 acts through the jack heads or caps 70 thereon to raise the horizontally extending frame member 49b and the upper movable frame unit 28b, and the parts or appurtenances carried thereby, above the lower and relatively stationary frame unit 27 and the parts carried thereby, so as to provide access to the space or area between the upper and movable frame unit 28b and the parts carried thereby and the lower and relatively stationary frame unit 27b and the parts or appurtenances carried thereby for the purpose of removing broken fragments of glass, or for the purpose of maintenance and repair, or for other purposes.

When it is desired to lower the upper and relatively movable frame unit 28b and the parts carried thereby, the motor units 80 are reversed to lower the jack screws 69 in their cylinders 68 and this acts to lower the jack screws 69 in their cylinders 68 and this acts to lower the upper frame member 49b and the upper movable frame unit 28b, and the parts carried thereby, into their normal lowered working position, as in FIGS. 14, 15 and 16.

During movement of the jack screw members 69 of the horizontally stabilizing and guide members 79 serve to stabilize movement of the jack screws 69 and to prevent undesirable lateral movement or vibration thereof.

It will be noted that the preferred form of the invention illustrated in FIGS. 14–20 does not require the use of any brace members, such as the pivoted brace members 59 employed in the form of the invention illustrated in FIGS. 1 to 8, inclusive, since such brace members are unnecessary in the form of the invention illustrated in FIGS. 14–20 due to the positive action of the jack screw units 67 which effectively prevent any danger of accidental falling of the upper movable frame unit 28b when it is in raised position.

It will also be noted that in the practice of the present invention, and particularly in the use of the preferred form thereof illustrated in FIGS. 14–20, the upper movable frame unit 28b and the parts carried thereby can be raised relatively small or minute distances, such, for example, as ⅛" to accommodate the upper bank of rotary advancing rolls 32b and the upper bank of rotary brushes 36b and the upper bank of blower tubes 52b to variations in thickness of the flat glass sheets fed through the new glass washing apparatus. Thus, by means of such relatively fine adjustment of the upper and relatively movable frame unit and the parts carried thereby, relative to the lower and relatively stationary frame unit 27b and the parts or appurtenances carried thereby, flat glass sheets of varying thicknesses can be readily run through the new glass washing apparatus without undue wear on the rotary brushes and this is an important aspect of the present invention since without such adjustment, if the rotary brushes were set for a dwell of, for example, 1/16" on flat glass sheets of 1/2" thickness, the rotary brushes would have an excessive dwell and cause undue wear on the rotary brushes if flat glass sheets of greater thickness such, for example, as 3/16" dwell, were fed through the flat glass washing apparatus without making adjustment therefor.

It will thus be seen from the foregoing description, considered in conjunction with the accompanying drawings, that the present invention provides a new and improved glass washing apparatus having the desirable advantages and characteristics and accomplishing its intended objects including those hereinbefore pointed out and others which are inherent in the invention.

We claim:
1. Glass washing apparatus comprising
   (1) A relatively stationary lower supporting frame unit having appurtenances mounted thereon including lower banks of glass sheet-advancing rolls, rotary brushes and blower tubes;
   (2) a relative movable upper frame unit having appurtenances mounted thereon including upper banks of glass-sheeting advancing rolls, rotary brushes and blower tubes; and
   (3) means for raising he entire relatively movable upper frame unit and the said appurtenances carried thereby in a vertical direction and in a horizontal position above and relative to the said lower and relatively stationary frame unit and the said appurtenances carried thereby so as to separate the said upper and relatively movable frame unit and the said appurtenances carried from the said relative stationary lower frame unit and the said appurtenances carried thereby while maintaining the said upper and relatively movable frame unit and the appurtenances carried thereby, including the said upper banks of glass-sheeting advancing rolls, rotary brushes and blower tubes, in a generally horizontal position parallel to the said lower and relatively stationary frame unit and the said appurtenances carried thereby including the said lower banks of glass sheet advancing rolls, rotary brushes, and blower tubes.

2. Glass washing apparatus comprising
   (1) a relatively stationary lower supporting frame unit having appurtenances mounted thereon;
   (2) a relatively movable upper frame unit having appurtenances mounted thereon;
   (3) means for raising the said relatively movable upper frame unit and the said appurtenances carried thereby above and relative to the said lower and relatively stationary frame unit and the said appurtenances carried thereby so as to separate the said upper and relatively movable frame unit and the said appurtenances carried thereby from the said relatively stationary lower frame unit and the said appurtenances carried thereby;
   (4) brace means for bracing the said upper and relatively movable frame unit and the said appurtenances carried thereby against movement when the said upper and relatively movable frame unit and the appurtenances carried thereby are in raised position relative to the said lower and relatively stationary frame unit and the said appurtenances carried thereby; the said brace means including
      (a) brace members movably mounted on the said upper and relatively movable frame unit and adapted to be moved into vertical position and including lower end portions adapted to bear on the said lower and relatively stationary frame unit when the said upper and relatively movable frame unit and the said appurtenances carried thereby are in raised position; and the said washing apparatus including
   (5) latch means for manually latching the said brace members to the said upper and relatively movable frame unit and in a generally horizontal position.

3. Glass washing apparatus comprising
   (1) a relatively stationary lower supporting frame unit having appurtenances mounted thereon;
   (2) a relatively movable upper frame unit having appurtenances mounted thereon;
   (3) means for raising the said relatively movable upper frame unit and the said appurtenances carried thereby above and relative to the said lower and relatively stationary frame unit and the said appurtenances relatively stationary lower frame unit and the said appurtenances carried thereby;
   (4) brace means for bracing the said upper and relatively movable frame unit and the said appurtenances carried thereby against movement when the said upper and relatively movable frame unit and the appurtenances carried thereby are in raised position relative to the said lower and relatively stationary frame unit and the said appurtenances carried thereby;
   (5) the said means for raising the said upper and relatively movable frame unit and the appurtenances carried hereby relative to the said lower and relatively stationary frame unit and the appurtenances carried thereby comprising
      (1) jack screw units each including a
         (a) vertically extending jack cylinder mounted on the said relatively stationary lower frame unit;
         (b) a jack screw movably mounted in each of the said jack cylinders for vertical movement therein;
         (c) a jack head carried by each of the said jack screws and bearing against the said relatively movable upper frame unit;
         (d) power transmission means for operating the said jack screws in the said jack cylinders;
         (e) power means for operating the said power transmission means; and the said power transmission means including
         (f) horizontally extending operating shafts mounted on the said lower and relatively movable frame unit;
         (g) gear means on each of the said operating shafts;
         (h) gear means on each of the said jack screws meshing with the gear means on one of the said operaing shafts; and
         (i) stabilizing and brace means mounted on the said lower and relatively stationary frame unit adjacent the said gear means on the said jack screws for preventing lateral movement of the said jack screws during vertical movement thereof.

References Cited

UNITED STATES PATENTS

| | | | |
|---|---|---|---|
| 2,174,426 | 9/1939 | Talbot | 53—387 |
| 2,321,179 | 6/1943 | Boyer | 15—77 |
| 2,973,533 | 3/1961 | Franke | 15—88 X |
| 3,047,892 | 8/1962 | McRoberts et al. | 15—77 X |
| 3,106,152 | 10/1963 | Coffelt | 100—154 X |
| 3,266,074 | 8/1966 | Wehr | 15—77 |

EDWARD L. ROBERTS, *Primary Examiner.*